US011386457B2

(12) United States Patent
Malhotra et al.

(10) Patent No.: US 11,386,457 B2
(45) Date of Patent: Jul. 12, 2022

(54) INFORMED OPT-IN PREVIEWS FOR VIDEO ADVERTISEMENTS

(71) Applicant: Pinterest, Inc., San Francisco, CA (US)

(72) Inventors: Nipoon Malhotra, Mountain View, CA (US); Justin Velo, San Francisco, CA (US); Richard Neil Cancro, Jr., Portland, OR (US)

(73) Assignee: Pinterest, Inc., San Francisco, CA (US)

( * ) Notice: Subject to any disclaimer, the term of this patent is extended or adjusted under 35 U.S.C. 154(b) by 273 days.

(21) Appl. No.: 15/099,432

(22) Filed: Apr. 14, 2016

(65) Prior Publication Data

US 2017/0300969 A1    Oct. 19, 2017

(51) Int. Cl.
*G06Q 30/02*    (2012.01)
*G09G 5/00*    (2006.01)
(Continued)

(52) U.S. Cl.
CPC .......... *G06Q 30/0257* (2013.01); *G06F 3/14* (2013.01); *G06Q 30/0273* (2013.01);
(Continued)

(58) Field of Classification Search
CPC .......... G06Q 30/0257; G06Q 30/0273; G09G 5/003; G09G 5/005; G09G 5/34;
(Continued)

(56) References Cited

U.S. PATENT DOCUMENTS

2008/0163071 A1\* 7/2008 Abbott .................. G06Q 30/02
715/748
2013/0080895 A1\* 3/2013 Rossman ............ G06F 3/04883
715/720
(Continued)

FOREIGN PATENT DOCUMENTS

EP        3007084 A1    4/2016
JP     2006295236 A    10/2006
(Continued)

OTHER PUBLICATIONS

Adventive, "HTML5 Parallax Ads!", Nov. 23, 2015, https://www.adventive.com/post/html5-parallax-ads and linked demo https://console.adventive.com/ad/demohtml/0bb05596-3b6a-4afe-82da-0c1b21f100f0, pp. 1-14) (Year: 2015).\*
(Continued)

*Primary Examiner* — John Van Bramer
(74) *Attorney, Agent, or Firm* — Athorus, PLLC

(57) ABSTRACT

The described implementations facilitate the discovery and presentation of video advertisements in a non-intrusive manner by users of client devices. In one implementation, an informed opt-in preview representative of a video advertisement is generated. The informed opt-in preview is a short video presentation that is formed from frames extracted from the video advertisement that can be presented on a client device to provide a user with an overview of the video advertisement corresponding to that informed opt-in preview. For example, the video advertisement may be a two-minute video advertisement. In comparison, the informed opt-in preview may be as little as three—five seconds in length and simply provide an overview of the video advertisement.

25 Claims, 7 Drawing Sheets

(51) Int. Cl.
*G09G 5/34* (2006.01)
*G06F 3/14* (2006.01)
*G06F 3/0485* (2022.01)

(52) U.S. Cl.
CPC ............ *G09G 5/003* (2013.01); *G09G 5/005* (2013.01); *G09G 5/34* (2013.01); *G06F 3/0485* (2013.01); *G09G 2354/00* (2013.01); *G09G 2370/042* (2013.01)

(58) Field of Classification Search
CPC .................. G09G 2370/042; G09G 2354/00; G06F 3/14; G06F 3/0485
See application file for complete search history.

(56) References Cited

U.S. PATENT DOCUMENTS

| | | | |
|---|---|---|---|
| 2013/0191207 A1 | 7/2013 | Smallwood et al. | |
| 2013/0198600 A1* | 8/2013 | Lockhart | G06F 17/241 715/230 |
| 2014/0052527 A1* | 2/2014 | Roundtree | G06Q 30/0245 705/14.44 |
| 2014/0316913 A1 | 10/2014 | He et al. | |
| 2015/0029197 A1* | 1/2015 | Almosnino | G06T 13/80 345/474 |
| 2015/0081448 A1* | 3/2015 | Osotio | G06Q 30/0269 705/14.66 |
| 2015/0088667 A1* | 3/2015 | Suzuki | G06T 3/0006 705/14.73 |
| 2015/0268804 A1 | 9/2015 | Hwang et al. | |
| 2017/0011541 A1* | 1/2017 | Naor | G06T 13/20 |
| 2017/0264934 A1* | 9/2017 | Guo | H04N 21/8547 |

FOREIGN PATENT DOCUMENTS

| | | | | |
|---|---|---|---|---|
| JP | 2015504214 A | 2/2015 | | |
| JP | 2015504225 A | 2/2015 | | |
| JP | 2015154165 A | 8/2015 | | |
| JP | 5830153 B1 | 12/2015 | | |
| WO | 2012104855 A1 | 8/2012 | | |
| WO | WO-2012104855 A1 * | 8/2012 | ............ | H04W 4/21 |
| WO | 2013148291 A1 | 10/2013 | | |
| WO | WO-2013148291 A1 * | 10/2013 | ............ | G06Q 30/02 |

OTHER PUBLICATIONS

International Search Report and Written Opinion for PCT Application No. PCT/US2017/027503 dated Jun. 27, 2017.

Extended European Search Report from corresponding application No. EP 17783169.0, dated Nov. 25, 2019.

* cited by examiner

INFORMED OPT-IN PREVIEWS FOR VIDEO ADVERTISEMENTS

BACKGROUND

With the ever expanding amount of accessible digital content available to users, it continues to become more and more difficult to discover the content for which the user is searching and to present content in a matter that is easily discoverable. Video advertisements are currently presented to users as either an opt-in or an opt-out advertisement. An opt-in video advertisement is a presentation of a still image, such as an initial frame of the video advertisement. The user must actively select the image, i.e., opt-in, to view the video advertisement. In such a configuration, the user has little if any insight as to the content of the video advertisement, other than what the user can discern from the static image and/or any surrounding textual information. An opt-out video advertisement is an automatically starting video advertisement presented on the users display. In such a configuration, the user does not have the option to decide whether to view the advertisement and must actively stop the video advertisement, or leave the display in which the advertisement is presented, to avoid viewing the video advertisement.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

Figure 1:
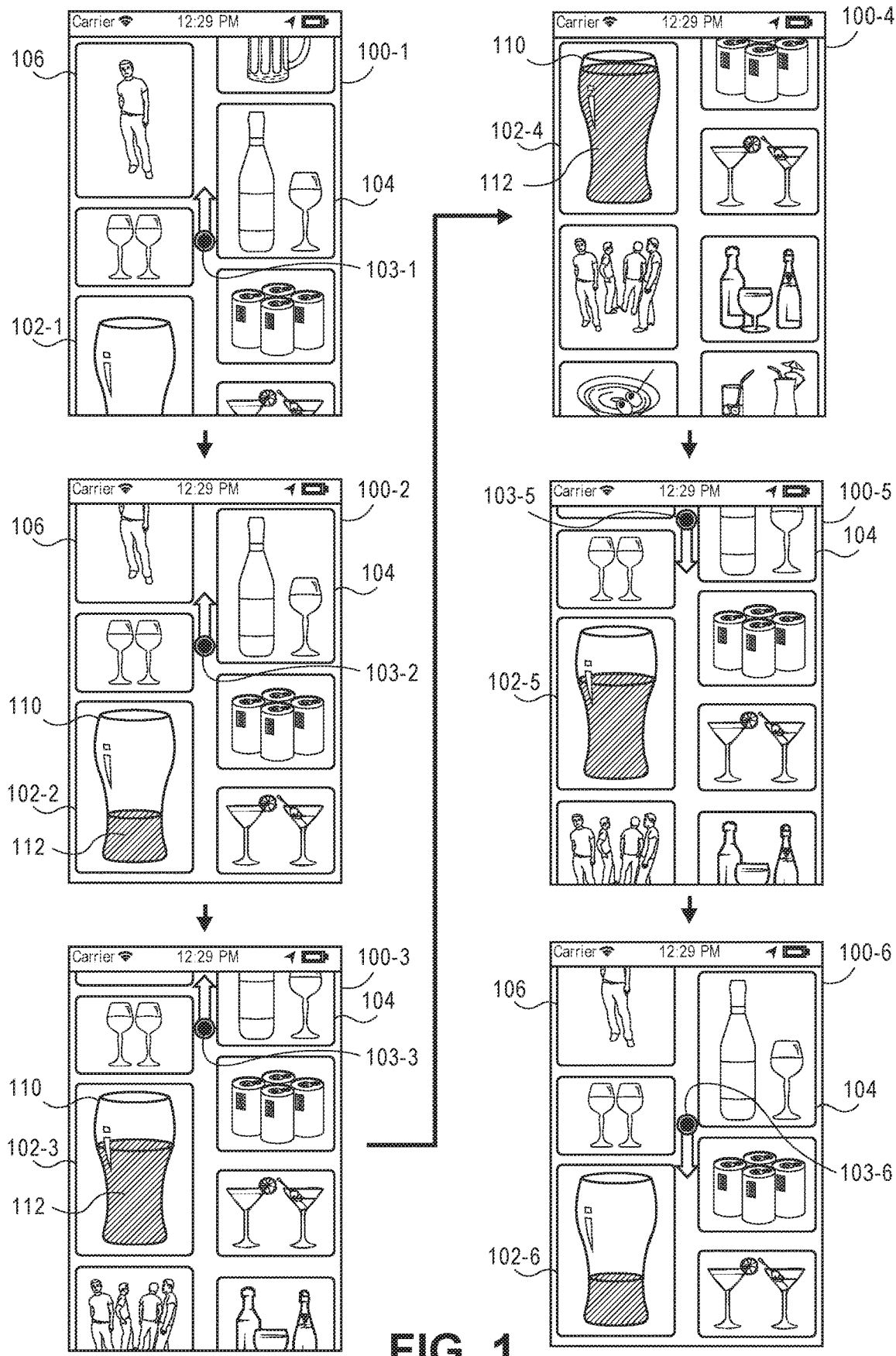
FIG. 1 is a representation of a progression of a display that includes an informed opt-in preview of a video advertisement, according to an implementation.

While implementations are described herein by way of example, those skilled in the art will recognize that the implementations are not limited to the examples or drawings described. It should be understood that the drawings and detailed description thereto are not intended to limit implementations to the particular form disclosed but, on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION

Described herein are systems and methods that facilitate the discovery and presentation of video advertisements in a non-intrusive manner by users of client devices. In one implementation, an informed opt-in preview representative of a video advertisement is generated or received along with a video advertisement. The informed opt-in preview is a short video presentation that is formed from frames extracted from the video advertisement that can be presented on a client device to provide a user with an overview of the video advertisement corresponding to that informed opt-in preview. For example, the video advertisement may be a two-minute video advertisement. In comparison, the informed opt-in preview may be as little as three—five seconds in length and simply provide an overview of the video advertisement.

In some implementations, the duration of the informed opt-in preview may be determined such that it can be viewed from an initial frame (beginning) to a final frame (end) as the informed opt-in preview is presented on a display of a client device and being scrolled visually across the display. Likewise, in some implementations, the presentation of the informed opt-in preview may be controlled and/or consistent with a scrolling of the information displayed on the client device that includes the informed opt-in preview. For, example, as a user is scrolling through information presented on a display of the client device, when an informed opt-in preview is scrolled into view an initial frame of the informed opt-in preview will be initially presented on the display of the client device. As the user continues to scroll such that the display of the informed opt-in preview moves across the display of the client device, the informed opt-in preview will progress forward at a rate consistent with the scrolling. If the user stops scrolling the displayed information, the presentation or progression of the informed opt-in preview likewise stops. If the user scrolls the displayed information in the opposite direction, the presentation of the informed opt-in preview regresses at a rate consistent with the opposite scrolling of the displayed information. In some implementations, the presentation of the informed opt-in preview may vary depending upon the screen size of the client device and/or a rate of scrolling of the presented content. For example, if the user is scrolling quickly, frames of the informed opt-in preview may be skipped and not presented.

By coordinating the presentation of the displayed informed opt-in preview with a scrolling of displayed information that includes the informed opt-in preview, a user is presented the informed opt-in preview and is able to control the presentation of the informed opt-in preview in a simple and intuitive manner. If the user desires to view the video advertisement that is represented by the informed opt-in preview, the user may select the informed opt-in preview and the corresponding video advertisement is presented to the user.

The informed opt-in preview implementations discussed herein provide a non-intrusive manner to present users with information relative to advertisements. Rather than the traditional opt-in advertisement method, which simply presents a static image indicating that a video advertisement may be selected for viewing, which provides little if any information about the advertisement, the described implementations provide the user information about the video advertisement so that the user can make an informed decision as to whether they desire to view the corresponding advertisement or not. The described implementations are also an improvement over the traditional opt-out advertisements which automatically cause the video advertisement to be presented when the information that includes the advertisement is viewed on the client device. The opt-out design is intrusive and presents the advertisement to the user without providing the user with the option of whether they are interested in viewing the advertisement or not.

FIG. 1 is a representation of a progression of a display that includes an informed opt-in preview 102 of a video advertisement, according to an implementation. The information 100 that includes the informed opt-in preview 102 may be presented on any form of a client device and/or size of display. For example, the client device may be a laptop computer, desktop computer, netbook, notebook, tablet, smart phone, and/or any other form of device that includes a display. Likewise, interaction with the displayed information (e.g., selection, scrolling), may be performed using any type of input device. In some implementations, the display of the client device may be a touch sensitive display and the user may interact with the presented information using a finger or other pointing device to scroll and/or select objects presented in the information. Alternatively, or in addition thereto, a mouse, keyboard and/or other input device may be used to interact with the displayed information. An example client device is discussed further below with respect to FIGS. 6-7.

As illustrated in the progressions of FIG. 1, a user may scroll through presented information 100 by, for example, scrolling up through the information or scrolling down through the information. The displayed information 100-1 is an initial presentation on a display of a client device. In this example, the initially displayed information 100-1 includes a first image 106, a second image 104 and an informed opt-in preview 102-1. The informed opt-in preview is just coming into view on the display of the client device. As discussed further below, as an informed opt-in preview 102 is coming into view on the display of a client device, or at a defined initial position on the display of the client device, an initial frame 102-1 of the informed opt-in preview is presented in the displayed information. The initial frame 102-1 may be presented in a manner that is visually similar to other information presented on the display, such as the first image 106 and/or the second image 104.

A user may interact with the displayed information 100 by providing an input, illustrated as input 103-1, in either a positive, or upward direction, as illustrated, or in a negative or downward direction, as discussed further below. When the user visually scrolls the displayed information in a positive direction, the presented information moves upward and begins to move off the display of the client device. For example, the displayed information 100-2 is presented in response to the user input 103-1 scrolling the information in a positive direction. As shown, the first image 106 is beginning to move off the display and the second image 104 has moved up toward the top of the displayed information. Likewise, the informed opt-in preview 102-2 is now fully presented on the display of the client device. In this example, the glass 110 represented in the informed opt-in preview 102-2 appears to contain a small portion of a liquid 112.

As the user continues to provide an input 103-2 in a positive direction, the displayed information continues to scroll upward in a positive direction, as illustrated by information 100-3. The displayed information, such as the second image 104, continues to move upward and off the display of the client device. Additional information may come into view on the display of the client device. In addition, as the display of the informed opt-in preview 102 moves upward, the presentation of the informed opt-in preview progresses in a positive direction that is consistent with the positive scrolling of the displayed information. For example, as the informed opt-in preview 102 is scrolled upward, the presentation is updated so that the glass 110 appears to be filling up with the liquid 112 as the informed opt-in preview moves from the position illustrated as 102-2 to the position illustrated as 102-3. The progression of the informed opt-in preview 102 may be accomplished by presenting different frames of the informed opt-in preview.

The speed and/or direction of playback of the informed opt-in preview 102 may be controlled by the speed and/or direction of the user input that causes the scrolling of the displayed information. In one implementation, as discussed below, the duration of the informed opt-in preview may be selected such that the entire informed opt-in preview may be presented in the time required to move a display of the informed opt-in preview from one edge of the display of the client device (e.g., the bottom of the display) to an opposing edge of the client device (e.g., the top of the display).

For example, as the user continues to provide an input 103-3 in a positive direction, the displayed information continues to scroll upward, as illustrated by displayed information 100-4. As illustrated, as the displayed information continues to scroll in a positive direction and the informed opt-in preview 102 continues to visually move upward toward the top of the display of the client device, the presentation of the informed opt-in preview progresses such that the glass 110 continues to appear to be filled with a liquid 112. In the informed opt-in preview 102-4, the glass 110 appears to be almost completely full with the liquid 112. In this example, the presentation of the informed opt-in preview 102-4 corresponds to a final or last frame of the informed opt-in preview that is displayed when the informed opt-in preview reaches a top or final position on the display of the client device.

From the position of the displayed information 100-1 to the position of the displayed information 100-4, the informed opt-in preview 102 has been fully presented to provide information to the user that the video advertisement associated with the informed opt-in preview corresponds to a beverage.

If the user provides an input 103-5 that causes the displayed information to be scrolled in a negative or downward direction, the informed opt-in preview regresses, presenting previous frames. For example, the position of the displayed information 100-5 is in response to an input in a negative or downward direction. As the informed opt-in preview moves back down the display of the client device, the liquid 112 appears to be emptying or disappearing from the glass 110 included in the informed opt-in preview 102, as illustrated by the position of the informed opt-in preview 102-5. Likewise, as the displayed information is scrolled in a negative direction, or downward, other images, such as the second image 104 re-appear on the display.

Finally, as the user continues to provide an input 103-6 in a negative direction, such that the displayed information 100-6 continues to move in a negative direction (or back down the display), the informed opt-in preview continues to regress such that the liquid 112 continues to empty from the glass 110 until an initial frame is again presented with the displayed information. For example, the position of the displayed information 102-6 is again at the bottom of the displayed information and the informed opt-in preview has regressed back to an initial frame.

A user may control the progression or regression of the informed opt-in preview by providing an input that causes the displayed information that includes the informed opt-in preview to scroll in a positive or negative direction. Likewise, the speed of progression or regression of the informed opt-in preview may be controlled by the user input based on a speed of the scrolling of the displayed information in either a positive or negative direction.

By presenting an informed opt-in preview as part of the information and progressing/regressing the presentation of the informed opt-in preview in response to inputs by the user, the user is in control of the informed opt-in preview and can view the presented information at a speed and direction desired by the user prior to the user deciding whether or not the user is interested in the video advertisement represented by the informed opt-in preview. The informed opt-in preview provides a non-intrusive mechanism to present information to a user corresponding to a video advertisement without disrupting the user's consumption of the displayed information that includes the informed opt-in preview.

Figure 2:
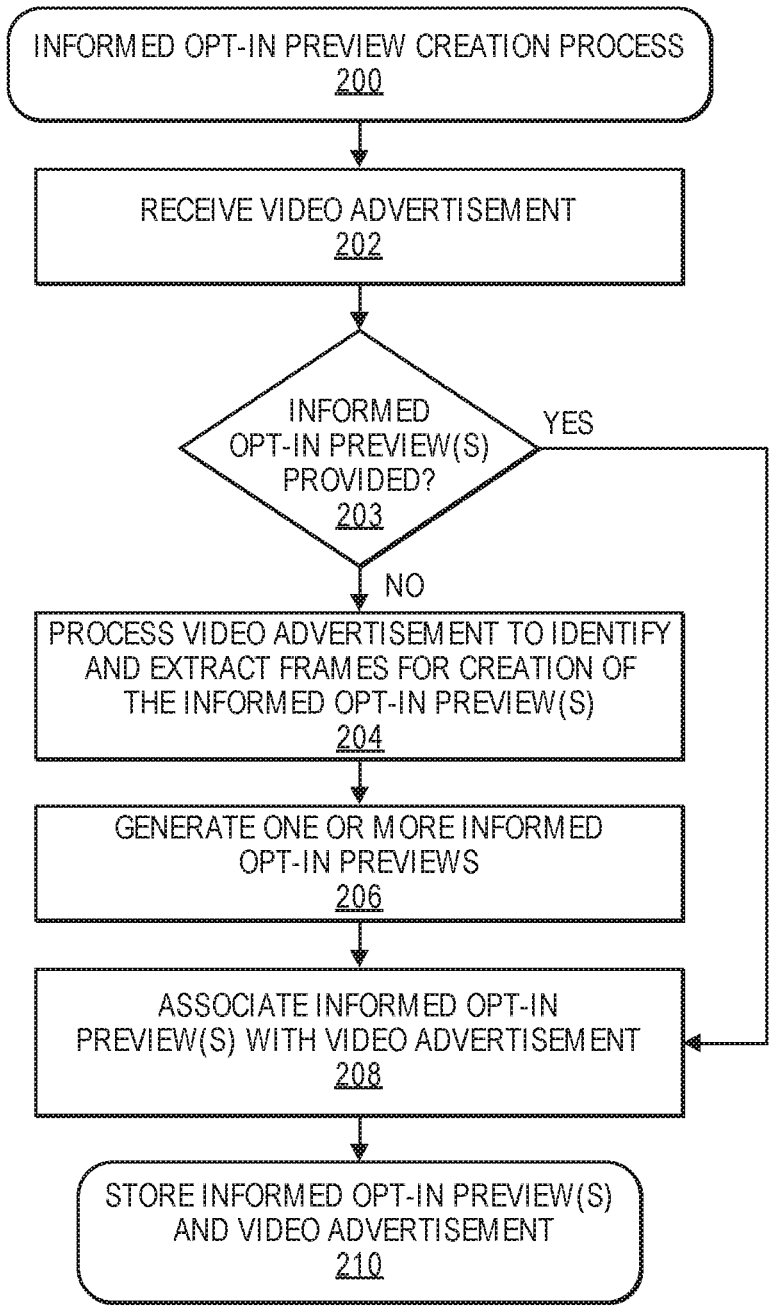
FIG. 2 is a flow diagram of an example informed opt-in preview creation process, according to an implementation.

FIG. 2 is a flow diagram of an example informed opt-in preview creation process 200, according to an implementation. The example process 200 of FIG. 2 and each of the other processes discussed herein may be implemented in hardware, software, or a combination thereof. In the context of software, the described operations represent computer-executable instructions stored on one or more computer-readable media that, when executed by one or more processors, perform the recited operations. Generally, computer-executable instructions include routines, programs, objects, components, data structures, and the like that perform particular functions or implement particular abstract data types.

The computer-readable media may include non-transitory computer-readable storage media, which may include hard drives, floppy diskettes, optical disks, CD-ROMs, DVDs, read-only memories (ROMs), random access memories (RAMs), EPROMs, EEPROMs, flash memory, magnetic or optical cards, solid-state memory devices, or other types of storage media suitable for storing electronic instructions. In addition, in some implementations the computer-readable media may include a transitory computer-readable signal (in compressed or uncompressed form). Examples of computer-readable signals, whether modulated using a carrier or not, include, but are not limited to, signals that a computer system hosting or running a computer program can be configured to access, including signals downloaded through the Internet or other networks. Finally, the order in which the operations are described is not intended to be construed as a limitation, and any number of the described operations can be combined in any order and/or in parallel to implement the routine.

The example process 200 begins upon receipt of a video advertisement, as in 202. While the implementations discussed here describe video advertisements, the implementations are equally application to other forms of digital content and/or other forms of advertisements. For example, the implementations may be used for videos, movies, etc., and an informed opt-in preview may be created from any received video.

Upon receipt of a video advertisement a determination is made as to whether one or more informed opt-in previews are provided or included with the received video advertisement, as in 203. For example, a promoter of a video advertisement may generate an informed opt-in preview representative of a video advertisement and provide the informed opt-in preview in conjunction with the video advertisement.

If it is determined that an informed opt-in preview is not provided with the received video advertisement, the video advertisement is processed to identify and extract frames from the video advertisement that are used to create an informed opt-in preview that is representative of the video advertisement, as in 204. Any number of techniques may be used to identify and extract frames for use in creating the informed opt-in preview. For example, keyframes of the video advertisement may be identified and extracted. In other implementations one or more keyframes may be selected and other frames that have color variations from the selected keyframe(s) may be selected and extracted. For example, a delta or difference between the color of a selected keyframe and the color of other frames of the video may be determined and frames that do not exceed a maximum difference may be selected for extraction.

Upon extraction of frames from the video advertisement, one or more informed opt-in previews are created from the extracted frames that are representative of the received video advertisement, as in 206. In some implementations, a single defined length informed opt-in preview may be created for a video advertisement. In such an implementation, a speed at which the video advertisement is presented to a user may be dependent on a display size and/or other display characteristics such that the entire informed opt-in preview will be presented as the informed opt-in preview is scrolled from one portion of a display of a client device to a second, opposite portion of a display of a client device. For example, if the informed opt-in preview is being viewed on a small display of a portable device, the presentation of the informed opt-in preview may be quick in response to scrolling compared to a similar presentation on a twenty-four-inch desktop monitor.

In other implementations, multiple informed opt-in previews may be generated for a single video advertisement, each of the multiple informed opt-in previews having a different duration, different number of frames, different presentation characteristics, and/or different content. For example, a first informed opt-in preview of a first length may be created for client devices that utilize small displays (e.g., smart phones). A second informed opt-in preview of a second length may be created for client devices that utilize mid-size displays (e.g., tablets), and a third informed opt-in preview of a third length may be created for client devices with larger displays (e.g., laptops, desktops).

In another example, different informed opt-in previews may be generated for presentation to different users. For example, a first opt-in preview about a video advertisement may be generated based on user preferences of a first user or first group of users and a second informed opt-in preview about the video advertisement, which may include different content, length, style, etc., may be formed based on user preferences of a second user or second group of users.

As will be appreciated, any number, size and/or other variation of informed opt-in previews may be created for a video advertisement.

An informed opt-in preview may be created in the form of a video, having any video file format (e.g., MPEG-4, wmv, gif, acc). Alternatively, an informed opt-in preview may be formed of a series of images (e.g., jpeg) formed from frames extracted from the video advertisement.

Processing of the video advertisement and/or generation of the informed opt-in preview may be automated and/or manual. For example, one or more processing algorithms may be utilized to identify and extract frames from the video advertisement and a user may select which of the extracted frames are to be included in the informed opt-in preview. In other implementations, the selection of frames from the video advertisement and the generation of the informed opt-in preview may be completely automated or completely manual.

Upon creation of one or more informed opt-in previews, the created informed opt-in previews are associated with the received video advertisement, as in 208. The association may be maintained in a data store or other memory component. Likewise, the informed opt-in preview(s) and the video advertisement are stored in a data store so that an informed opt-in preview may be selected and included in information that is sent for display on a client device, as in 210.

Figure 3:
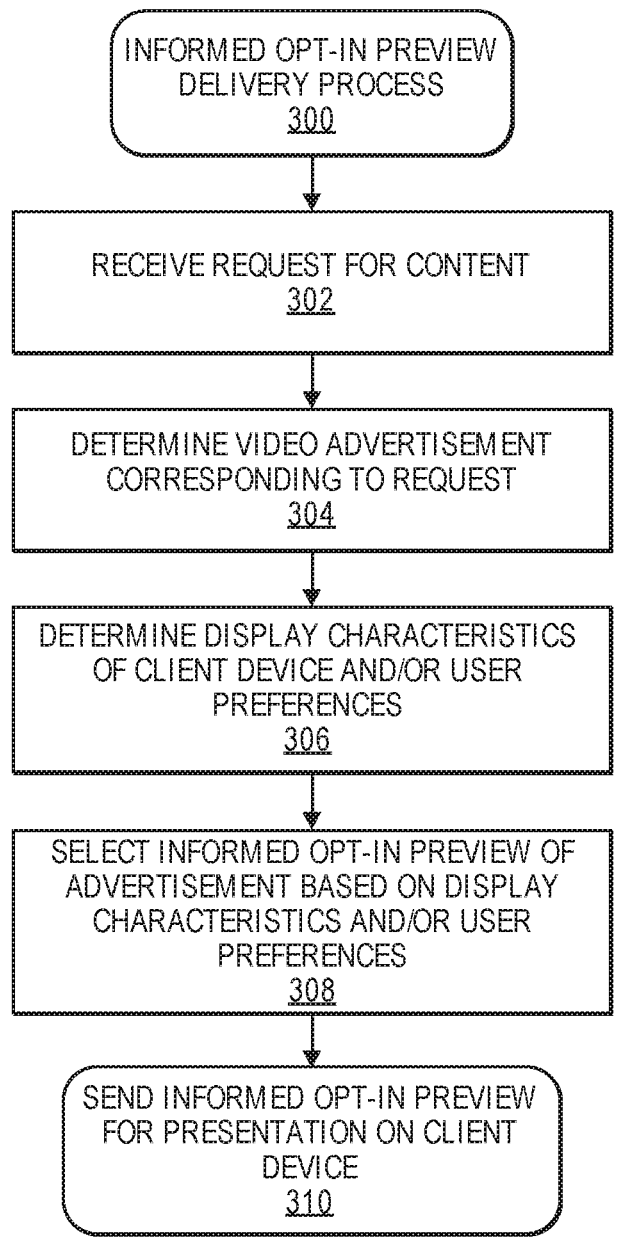
FIG. 3 is a flow diagram of an example informed opt-in preview delivery process, according to an implementation.

FIG. 3 is a flow diagram of an example informed opt-in preview delivery process 300, according to an implementation. The example process 300 begins upon receipt of a request for content, as in 302. A request may be received from a client device and may be a request for any type of content. For example, the request may be a keyword search, a request for a webpage, a request for a home feed or other delivery of information to an application running on a client device, etc.

In response to receiving a request, a video advertisement corresponding to the request is determined, as in 304. For example, video advertisements may be categorized, associated with keywords, directed towards target audiences (e.g., users, or user types), etc. Based on the received request for content, a video advertisement is determined based on the information associated with the video advertisement. For example, if the video advertisement corresponds to beverages and a request is received that includes a keyword search for beverages, the video advertisement may be selected. As another example, a promotion plan for a video advertisement may indicate that the video advertisement is to be sent to users between the ages of twenty-five and thirty-five. If a request for content is received from a client device associated with a user that is twenty-seven years old, the video advertisement may be selected. As will be appreciated, any variety of video advertisements and/or criteria for selection or determination of a video advertisement may be utilized. In some implementations, video advertisements may be randomly selected.

In addition to determining a video advertisement, one or more display characteristics of a client device to which information is to be delivered for presentation in response to the request and/or user preferences of a user that requested the content is determined, as in 306. For example, based on information provided with the request, a device type or device category (e.g., smart phone) may be determined and corresponding display characteristics determined. Likewise, a user may be associated with the client device and user preferences may be known or maintained for that user. For example, a user may provide information about themselves and/or viewing, browsing, purchase habits may be monitored and utilized to determine user preferences. In other implementations, determination of display characteristics and/or user preferences may be optional.

Based on the determined display characteristics and/or user preferences, an informed opt-in preview associated with the determined video advertisement is selected, as in 308. For example, if it is determined that the display characteristics of the device include a small display, an informed opt-in preview that is short in duration compared to other informed opt-in previews associated with the video advertisement may be selected so that viewing of the informed opt-in preview is optimized for the smaller display. Likewise, if it is determined that the user prefers opt-in previews of a first type or having a first type of content, an informed opt-in preview corresponding to the video advertisement and having a first type or first type of content may be selected. In comparison, if it is determined that the display is lager, a longer duration informed opt-in preview may be selected.

Finally, the selected informed opt-in preview associated with the determined video advertisement is sent for presentation on the client device, as in 310. For example, the informed opt-in preview may be incorporated into other information that is sent to the client device for presentation in response to the request for content. Likewise, in some implementations, the video advertisement associated with the informed opt-in preview may also be sent with the information. In such an implementation, the video advertisement may not be presented to the user unless the user actively selects the presented informed opt-in preview, an indication of a request to view the video advertisement. In other implementations, the informed opt-in preview may be sent to the client device, alone or with other information, and the informed opt-in preview may include an identifier of the associated video advertisement. If the user, upon viewing a presentation of the informed opt-in preview selects the informed opt-in preview, the identifier may be sent from the client device to request the associated video advertisement.

Figure 4:
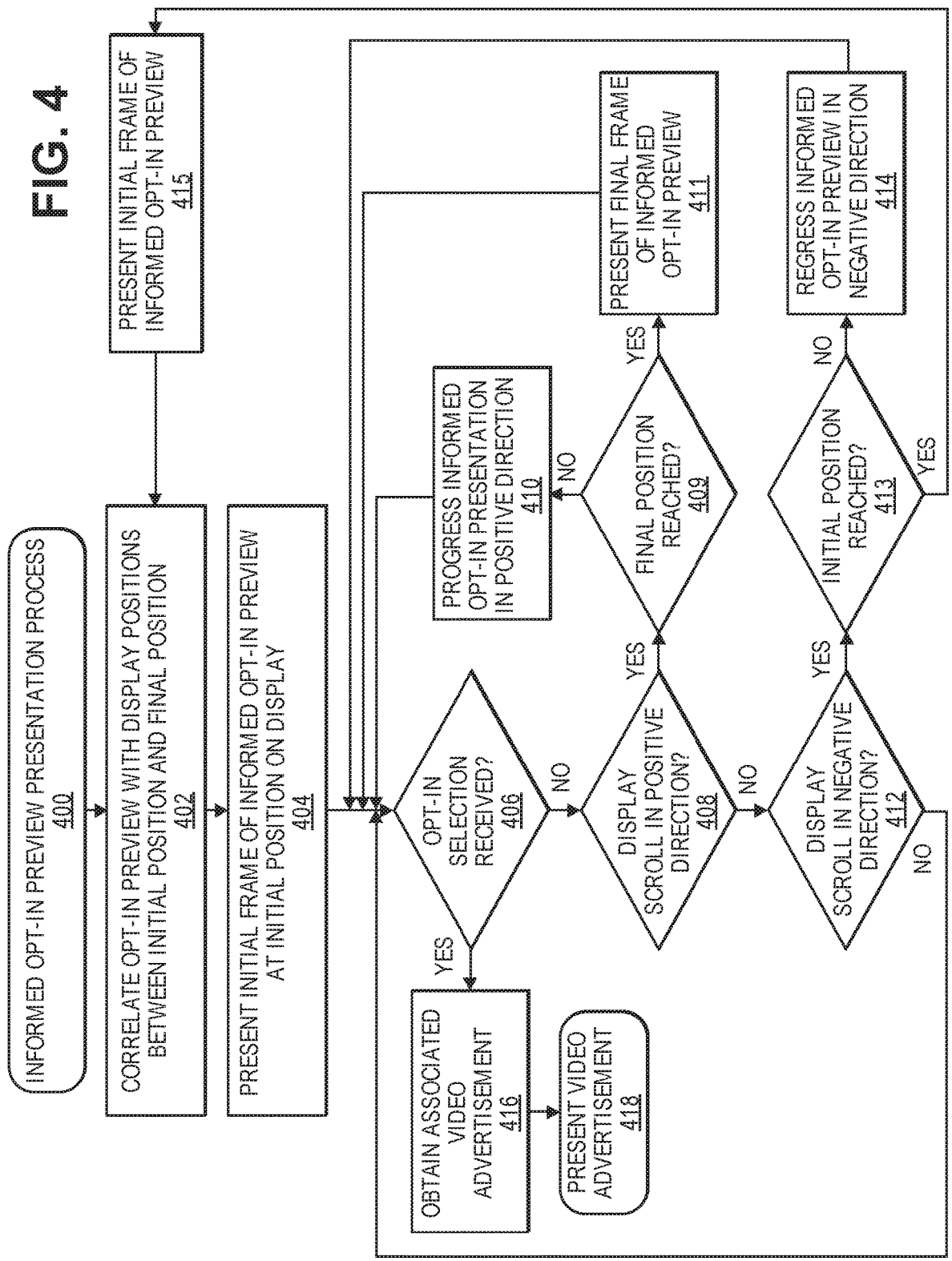
FIG. 4 is a flow diagram of an example informed opt-in preview presentation process, according to an implementation.

FIG. 4 is a flow diagram of an example informed opt-in preview presentation process 400, according to an implementation. The example process 400 begins by correlating a received informed opt-in preview with display positions between an initial position and a final position, as in 402. For example, an initial position near or adjacent one edge of a display on a client device may be defined as an initial position and another position near or adjacent a second, opposing edge of the display may be selected as a final position. An initial frame of the informed opt-in preview may be associated with the initial position and a final frame associated with the final position. Other frames of the informed opt-in preview may be associated with other positions between the initial position and the final position on the display.

As the informed opt-in preview is presented on the display of the client device, an initial frame of the informed opt-in preview is presented at the initial position, as in 404. Such a presentation of the initial fame may be provided if the informed opt-in preview is initially presented at a base or edge of the display associated with the initial position. In other implementations, if the informed opt-in preview is initially presented at another position on the display of the client device, a frame of the informed opt-in preview that is associated with that position may be presented, rather than the initial frame. For example, if the initial presentation of the informed opt-in preview is toward a center of the display of the client device, the first frame of the informed opt-in preview may be toward a middle of the informed opt-in preview so that the position of the displayed informed opt-in preview on the client device corresponds with a progression of the informed opt-in preview.

Upon displaying a frame of the informed opt-in preview on the client device, a determination is made as to whether an opt-in selection is received, as in 406. An opt-in selection may be received by a user selecting the informed opt-in preview, which may be interpreted as a request to view the associated video advertisement. In another example, an opt-in selection may be inferred based on activities of the user. For example, if the user is progresses/regresses the informed opt-in preview a defined number of times and/or the informed opt-in preview is presented for a defined period of time, it may be inferred that the user is interested in the corresponding video advertisement and an opt-in selection inferred.

If it is determined that an opt-in selection is received, the video advertisement associated with the presented informed opt-in preview is obtained, as in 416. In some implementations, the video advertisement may have been sent to the client device along with the informed opt-in preview and any other presented information and stored in a memory (e.g., temporary memory, cache) of the client device. In other implementations, upon receiving an opt-in selection, an identifier of the video advertisement associated with the informed opt-in preview may be sent from the client device and the video advertisement obtained from a remote data store and provided to the client device.

Upon obtaining the video advertisement, the video advertisement is presented to the user, as in 418. In some implementations, the video advertisement may be presented in the same portion of the display as was occupied by the informed opt-in preview. In other implementations, the video advertisement may be presented full-screen on the display of the device, or on a portion of the display that is larger than the portion occupied by the informed opt-in preview. Such presentation of the video advertisement is acceptable because the user has made an informed consent and actively requested to view the video advertisement associated with the selected informed opt-in preview.

Returning to decision block 406, if it is determined that an opt-in selection has not been received, a determination is made as to whether an input is received to scroll the displayed information in a positive direction, as in 408. While the above discussion provided with respect to FIG. 1 describes a positive direction being in an upward direction with respect to the displayed information, it will be appreciated that a positive direction, as used herein, may be any direction of viewing selected by the user. For example, if the user is viewing information on a laptop or desktop computer, the positive direction may correspond with a downward scrolling of information. Likewise, a negative direction, as used herein, is any direction that is opposite the positive direction.

If it is determined that an input to scroll the displayed information in a positive direction has been received, a determination is made as to whether a final position of the display has been reached at which the informed opt-in preview is being displayed, as in 409. If it is determined that a final position on the display of the client device has not been reached, the informed opt-in preview is progressed in a positive direction consistent with a scrolling of the displayed information, as in 410, and the example process 400 returns to decision block 406 and continues. However, if it is determined that a final position on the display of the client device has been reached, the final frame of the informed opt-in preview is presented on the display of the client device, as in 411, and the example process 400 returns to decision block 406 and continues.

Returning to decision block 408, if it is determined that an input to scroll the displayed information in a positive direction has not been received, a determination is made as to whether an input has been received to scroll the displayed information in a negative direction (i.e., a direction opposite the positive direction), as in 412. If it is determined that an input to scroll the displayed information in a negative direction has also not been received, the example process 400 returns to decision block 406 and continues. However, if it is determined that an input to scroll the displayed information in the negative direction has been received, a determination is made as to whether an initial position on the display of the client device has been received by the presented informed opt-in preview, as in 413. If it is determined that the initial position has been reached, the initial frame of the informed opt-in preview is presented on the display of the client device, as in 415. If it is determined that the initial position has not been reached, the informed opt-in preview is regressed in a negative direction in a manner consistent with the scrolling of the displayed information, as in 414. Upon presenting the initial frame (block 415) or regressing the presentation of the informed opt-in preview in the negative direction (block 414), the example process returns to decision block 406 and continues.

The example process 400 may continue for the duration of time the informed opt-in preview is presented, in whole or in part, on a display of the client device. As such, a user can control a progression or regression of the presentation of the informed opt-in preview on the display of the client device and make an informed decision as to whether the user desires to view the video advertisement associated with the presented informed opt-in preview.

In some implementations, in addition to determining a direction of the display scroll, a speed of the scrolling may be determined. If the determined speed of the scrolling exceeds a threshold, one or more frames of the informed opt-in preview may not be presented on the display of the client device as the presentation of the informed opt-in preview progresses/regresses. Skipping of frames of the informed opt-in preview when scrolling exceeds a determined speed or threshold may result in a smoother transition of the opt-in preview presentation.

Figure 5:
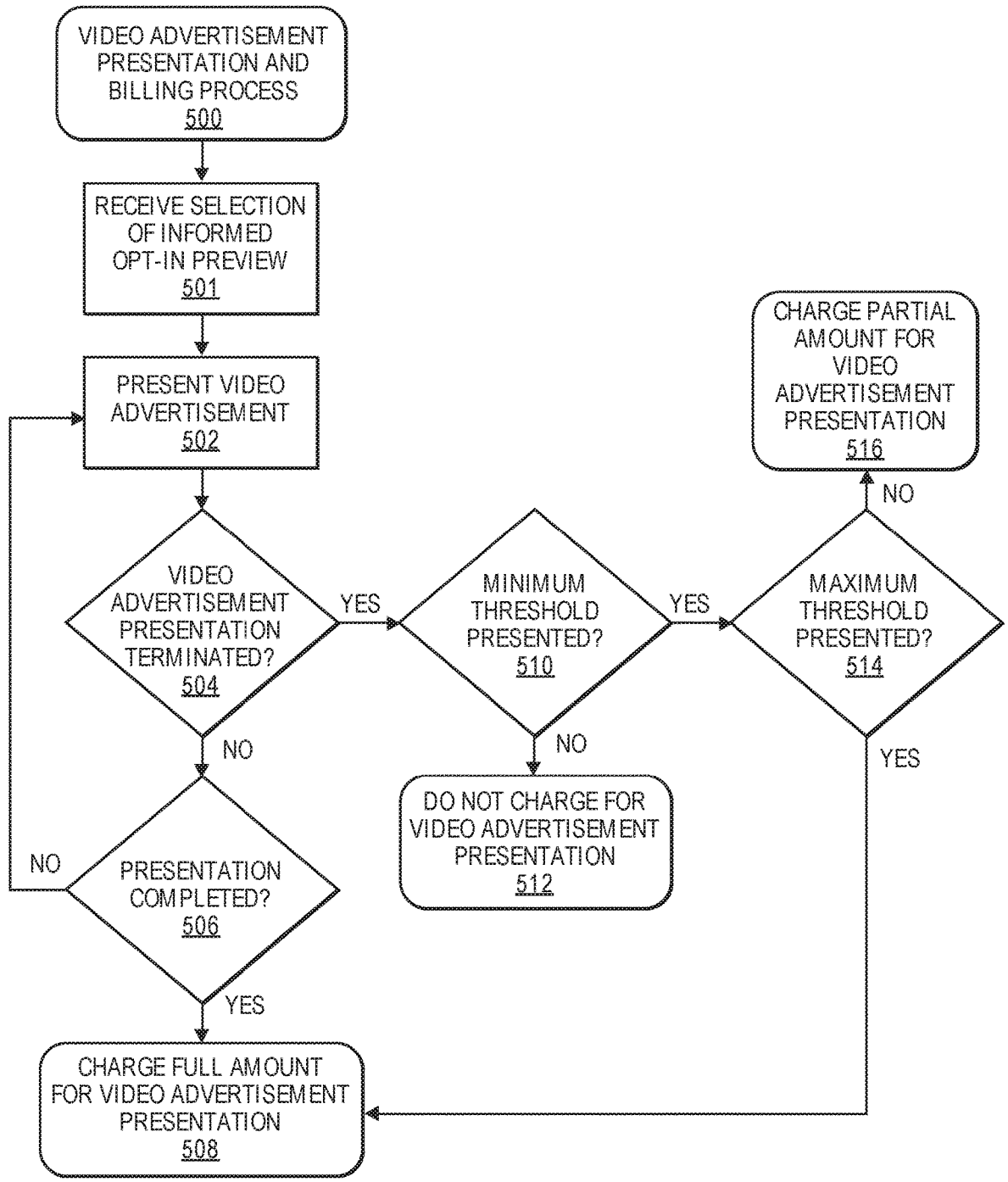
FIG. 5 is a flow diagram of an example video advertisement presentation and billing process, according to an implementation.

FIG. 5 is a flow diagram of an example video advertisement presentation and billing process 500, according to an implementation. In many implementations, promoters of products or advertisements may provide video advertisements for presentation using the described implementations. Such promoters may be the seller of products represented in the advertisements, advertisement aggregators, resellers, etc. In the described implementations, a promoter of a video advertisement may not be charged a fee for a presentation of an informed opt-in presentation representative of an advertisement. However, as described in the following example process 500, a promoter may be charged or billed a fee when a user selects and views a portion or all of a video advertisement associated with an informed opt-in preview. Because the user is making an informed consent and selection to view the video advertisement, after viewing the informed opt-in preview, the rates charged for the presentation of the video advertisement may be higher. Likewise, the conversion of user purchase for an advertised item or service will likely be higher for viewed video advertisements for which a fee is paid because the user has made an affirmative decision, after being informed about the subject matter of the advertisement, to select and view the video advertisement.

The example process 500 begins upon receipt of a user selection of informed opt-in preview, or user selection being inferred, as discussed above, such selection indicative of a request by the user to view the video advertisement associated with the informed opt-in preview, as in 501. Upon receipt of the selection, the video advertisement associated with the selected informed opt-in preview is presented on the display of the device to the user, as in 502. As discussed above, presentation of a video advertisement in response to a user selection may be provided full-screen on the display of the device, in a same portion of the display of the client device as the portion consumed by the informed opt-in preview, or at any other position on the display of the client device.

As the video advertisement is presented, a determination is made as to whether presentation of the video advertisement has terminated, as in 504. For example, if the user stops playback or presentation of the video advertisement and/or navigates the presented information such that the advertisement is no longer being presented on the client device, the client device (or an application running on the client device) may provide a notification to the example process 500 indicating that the presentation of the video advertisement has terminated. Such an indication may include an identification of the amount or duration of the video advertisement that was presented prior to termination.

If it is determined that the presentation of the video advertisement has not been terminated, a determination is made as to whether the presentation of the video advertisement has completed, as in 506. Similar to termination, upon completion of a presentation of the video advertisement, the client device and/or an application executing on the client device may provide a notification to the example process 500 indicating that presentation of the video advertisement has completed.

If it is determined that the presentation of the video advertisement has not been terminated and has not completed, the example process returns to block 502 and continues. However, if it is determined that the presentation of the video advertisement was not terminated (decision block 504) and has completed (decision block 506), a full agreed upon amount is charged or billed to the promoter of the advertisement for the presentation of the advertisement, as in 508.

Returning to decision block 504, if it is determined that presentation of the video advertisement was terminated prior to completion of the presentation of the video advertisement, a determination is made as to whether a minimum threshold of the video advertisement was presented prior to termination, as in 510. A minimum threshold may be any defined or agreed upon amount or percentage of the video advertisement. For example, it may be determined that the minimum threshold is at least ten percent of the presentation of the video advertisement. In other implementations, the minimum threshold may be zero percent such that any presentation of the video advertisement is considered to exceed the minimum threshold. In still other implementations, the minimum threshold may be a different value or percentage.

If it is determined that the presentation of the video advertisement did not exceed the minimum threshold, a promoter of the video advertisement is not charged or billed a fee for the partial presentation of the video advertisement, as in 512.

If it is determined that the presentation of the video advertisement did exceed the minimum threshold, a determination is made as to whether the presentation of the video advertisement exceeded a maximum threshold, as in 514. Similar to the minimum threshold, the maximum threshold may be any agreed upon or defined amount or percentage of the video advertisement. For example, it may be determined that the maximum threshold is at least eighty-five percent of the presentation of the video advertisement. In other implementations the minimum threshold may be higher or lower.

If it is determined that the presentation of the video advertisement exceeded the maximum threshold, the promoter of the advertisement is charged or billed the full amount for the presentation of the advertisement, as in 508. However, if it is determined that the presentation of the video advertisement does not exceed the maximum threshold, a partial or proportional amount or fee is billed or charged to the promoter of the video advertisement, as in 516. The partial or proportional amount may correspond to an amount of the video advertisement actually presented to the user.

While the above example describes charging a fee to an advertiser for a viewing or presentation of a video advertisement based on the amount of the video advertisement that was viewed or presented, in other implementations, a fee (either partial or full fee) may be charged to an advertiser upon any viewing or presentation of the video advertisement. For example, if a user selection of an opt-in preview is received and the corresponding video sent for presentation, a promoter of the video advertisement may be charged a fee at that time, regardless of the amount of the video advertisement that is actually presented to the user.

Figure 6:
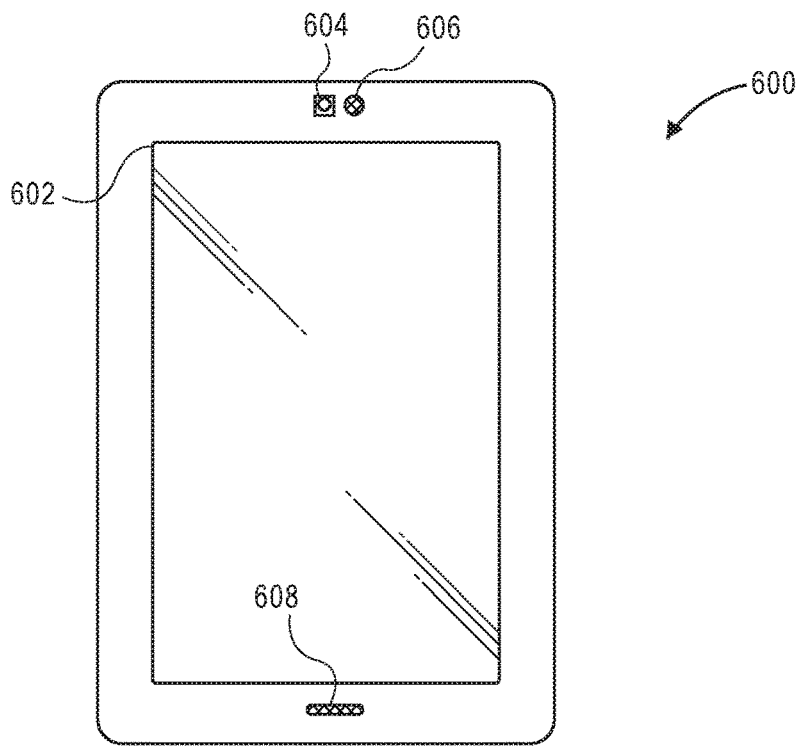
FIG. 6 illustrates an example computing device that can be used in accordance with various implementations.

FIG. 6 illustrates an example client device 600 that can be used in accordance with various implementations described herein. In this example, the client device 600 includes a display 602 and optionally at least one input component 604, such as a camera, on a same side of the device as the display 602. The client device 600 may also include an audio transducer, such as a speaker 606, and optionally a microphone 608. Generally, the client device 600 may have any form of input/output components that allow a user to interact with the client device 600. For example, the various input components for enabling user interaction with the device may include a touch-based display 602 (e.g., resistive, capacitive, camera (for gesture tracking, etc.), microphone, global positioning system (GPS), compass or any combination thereof. One or more of these input components may be included on a device or otherwise in communication with the device. Various other input components and combinations of input components can be used as well within the scope of the various implementations as should be apparent in light of the teachings and suggestions contained herein.

Figure 7:
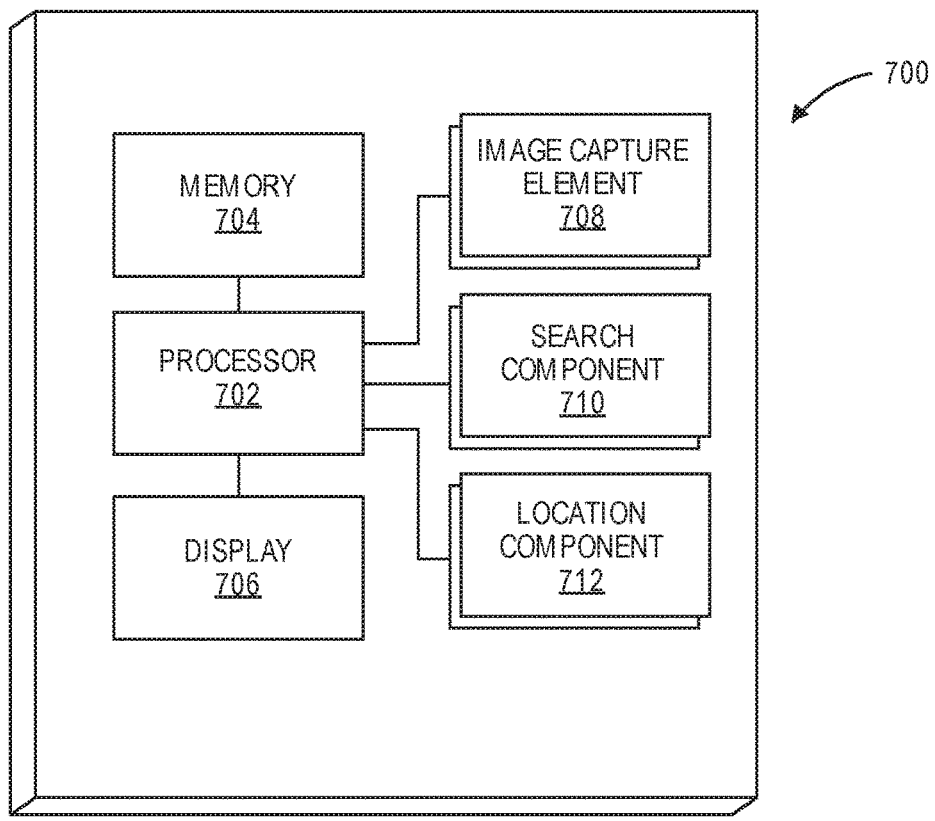
FIG. 7 illustrates an example configuration of components of a computing device, such as that illustrated in FIG. 6.

In order to provide the various functionality described herein, FIG. 7 illustrates an example set of basic components 700 of a client device 600, such as the client device 600 described with respect to FIG. 6 and discussed herein. In this example, the device includes at least one central processor 702 for executing instructions that can be stored in at least one memory device or element 704. As would be apparent to one of ordinary skill in the art, the device can include many types of memory, data storage or computer-readable storage media, such as a first data storage for program instruction for execution by the processor 702. Removable storage memory can be available for sharing information with other devices, etc. The device typically will include some type of display 706, such as a touch-based display, electronic ink (e-ink), organic light emitting diode (OLED) or liquid crystal display (LCD).

The example client device may also include at least one additional input device able to receive conventional input from a user. This conventional input can include, for example, a push button, touch pad, touch-based display, wheel, joystick, keyboard, mouse, trackball, keypad or any other such device or element whereby a user can input a command to the device. These I/O devices could be connected by a wireless, infrared, Bluetooth, or other link as well in some implementations. In some implementations, however, such a device might not include any buttons at all and might be controlled only through touch (e.g., touch-based display), audio (e.g., spoken) commands, or a combination thereof.

Figure 8:
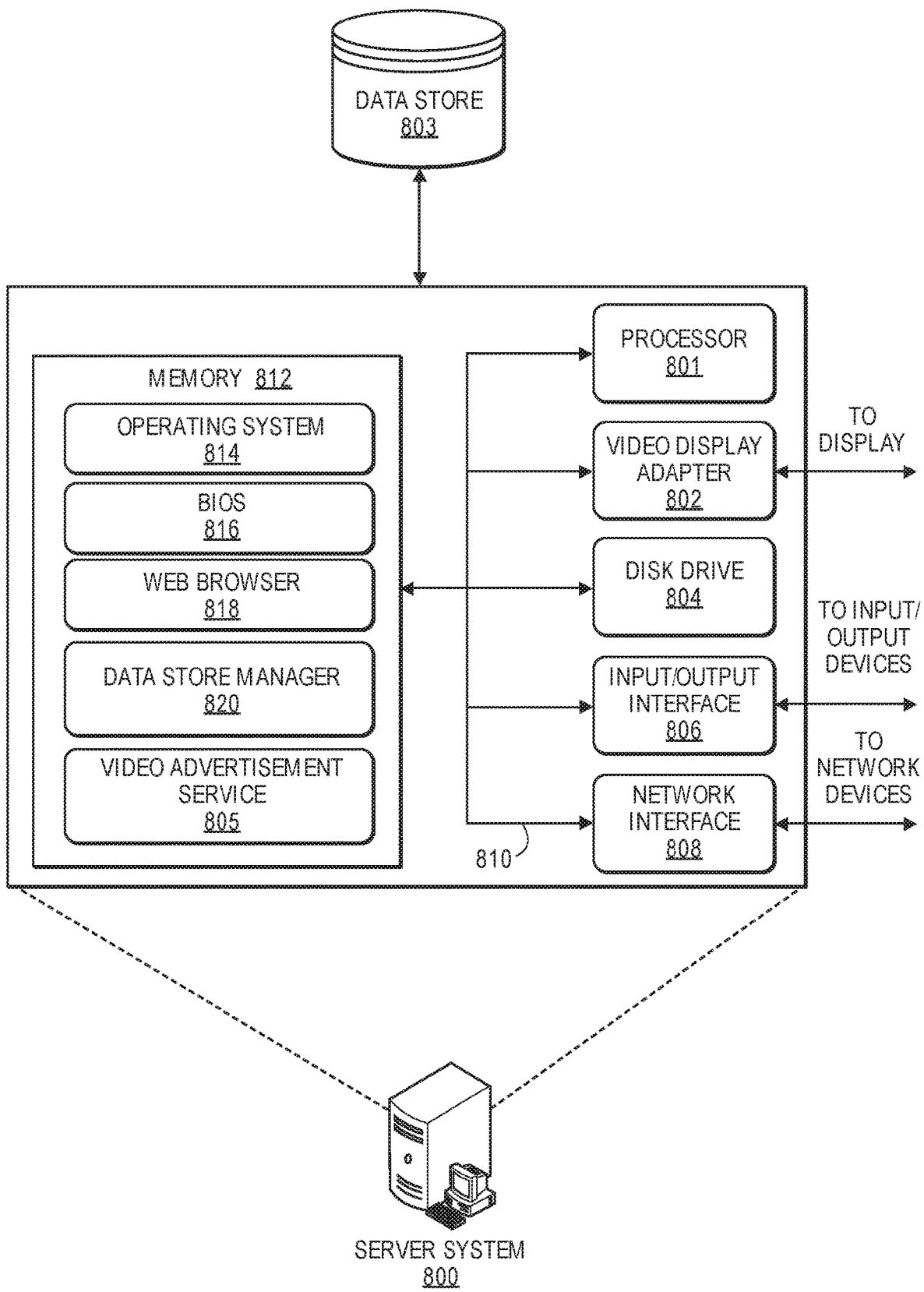
FIG. 8 is a pictorial diagram of an illustrative implementation of a server system that may be used for various implementations.

FIG. 8 is a pictorial diagram of an illustrative implementation of a server system 800, such as a remote computing resource, that may be used with one or more of the implementations described herein. The server system 800 may include a processor 801, such as one or more redundant processors, a video display adapter 802, a disk drive 804, an input/output interface 806, a network interface 808, and a memory 812. The processor 801, the video display adapter 802, the disk drive 804, the input/output interface 806, the network interface 808, and the memory 812 may be communicatively coupled to each other by a communication bus 810.

The video display adapter 802 provides display signals to a local display (not shown in FIG. 8) permitting an operator of the server system 800 to monitor and configure operation of the server system 800. The input/output interface 806 likewise communicates with external input/output devices not shown in FIG. 8, such as a mouse, keyboard, scanner, or other input and output devices that can be operated by an operator of the server system 800. The network interface 808 includes hardware, software, or any combination thereof, to communicate with other computing devices. For example, the network interface 808 may be configured to provide communications between the server system 800 and other computing devices, such as the client device 600, via the network 700, as shown in FIG. 7.

The memory 812 generally comprises random access memory (RAM), read-only memory (ROM), flash memory, and/or other volatile or permanent memory. The memory 812 is shown storing an operating system 814 for controlling the operation of the server system 800. A binary input/output system (BIOS) 816 for controlling the low-level operation of the server system 800 is also stored in the memory 812.

The memory 812 additionally stores program code and data for providing network services that allow client devices 600 and external sources to exchange information and data files with the server system 800. Accordingly, the memory 812 may store a browser application 818. The browser application 818 comprises computer executable instructions, that, when executed by the processor 801 generate or otherwise obtain configurable markup documents such as Web pages. The browser application 818 communicates with a data store manager application 820 to facilitate data exchange and mapping between the data store 803, client devices, such as the client device 600, external sources, etc.

As used herein, the term "data store" refers to any device or combination of devices capable of storing, accessing and retrieving data, which may include any combination and number of data servers, databases, data storage devices and data storage media, in any standard, distributed or clustered environment. The server system 800 can include any appropriate hardware and software for integrating with the data store 803 as needed to execute aspects of one or more applications for the client device 600, the external sources and/or the video advertisement service 805. The server system 800 provides access control services in cooperation with the data store 803 and is able to generate content such as informed opt-in previews representative of received video advertisements.

The data store 803 can include several separate data tables, databases or other data storage mechanisms and media for storing data relating to a particular aspect. For example, the data store 803 illustrated includes digital items (e.g., video advertisements, informed opt-in previews) and corresponding metadata about those items. Search history, user preferences, profiles and other information may likewise be stored in the data store.

It should be understood that there can be many other aspects that may be stored in the data store 803, which can be stored in any of the above listed mechanisms as appropriate or in additional mechanisms of any of the data store. The data store 803 may be operable, through logic associated therewith, to receive instructions from the server system 800 and obtain, update or otherwise process data in response thereto.

The memory 812 may also include the video advertisement service 805. The video advertisement service 805 may be executable by the processor 801 to implement one or more of the functions of the server system 800. In one implementation, the video advertisement service 805 may represent instructions embodied in one or more software programs stored in the memory 812. In another implementation, the video advertisement service 805 can represent hardware, software instructions, or a combination thereof.

The server system 800, in one implementation, is a distributed environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction in FIG. 8 should be taken as being illustrative in nature and not limiting to the scope of the disclosure.

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A non-transitory computer-readable medium having computer-executable instructions stored thereon, wherein the instructions, when executed, cause a computer system having at least one computer processor to perform a method comprising:
   receiving a request for content to be presented on a client device;
   selecting an informed opt-in preview from a plurality of informed opt-in previews associated with a video advertisement, wherein each of the plurality of informed opt-in previews is distinct from the video advertisement;
   displaying, on a display of the client device, information that includes at least a portion of the content and an initial frame of a plurality of frames of the informed opt-in preview;
   detecting a scrolling of the information presented on the display of the client device;
   updating the displayed information in response to the scrolling, wherein updating the displayed information includes:
      progressing the display of the plurality of frames of the informed opt-in preview according to a sequence in a first direction and at a first rate consistent with the scrolling;
      moving, simultaneously with the progressing of the display of the plurality of frames of the informed opt-in preview and consistent with the scrolling, the content across the display of the client device in a second direction and at a second rate consistent with the scrolling; and determining that the first rate exceeds a threshold and, based at least in part on the determination that the first rate exceeds the threshold, skipping at least one of the plurality of frames during the progressing of the display of the plurality of frames of the informed opt-in preview;

detecting a selection of the informed opt-in preview; and in response to the selection:
obtaining the video advertisement; and
displaying, on the display of the client device, the video advertisement.

2. The non-transitory computer-readable medium of claim 1, the method further comprising:

in response to the scrolling, determining that a position of the informed opt-in preview is at a final position on the display; and presenting a final frame of the plurality of frames of the informed opt-in preview.

3. The non-transitory computer-readable medium of claim 1, wherein:

the informed opt-in preview is selected from the plurality of informed opt-in previews based at least in part on a display size of the client device; and each of the plurality of informed opt-in previews includes a different resolution.

4. The non-transitory computer-readable medium of claim 3, wherein the informed opt-in preview is selected such that the informed opt-in preview will progress from the initial frame to a final frame as the informed opt-in preview is scrolled across the display of the client device.

5. A computing system, comprising:
one or more processors; and
a memory coupled to the one or more processors and storing program instructions that when executed by the one or more processors cause the one or more processors to at least:
select an informed opt-in preview from a plurality of informed opt-in previews associated with a video advertisement, wherein each of the plurality of informed opt-in previews is distinct from the video advertisement, and
present information on a display of a client device, the information including an initial frame of a plurality of frames of the informed opt-in preview, wherein:
presentation of the initial frame of the plurality of frames of the informed opt-in preview corresponds to an initial position on the display of the client device; and
presentation of a final frame of the plurality of frames of the informed opt-in preview corresponds to a final position on the display of the client device, the initial position and the final position being different;
progress a presentation of the plurality of frames of the informed opt-in preview and move a position of the opt-in preview on the display of the client device at a rate consistent with the scrolling such that presentation of a frame of the plurality of frames of the informed opt-in preview corresponds to the position of the informed opt-in preview on the display of the client device;
determine that a scrolling rate of the scrolling exceeds a threshold and, based at least in part on the determination that the scrolling rate exceeds the threshold, skip at least one of the plurality of frames during the presentation of the plurality of frames;
detect a selection of the informed opt-in preview; and
in response to the selection:
obtain the video advertisement; and
display, on the display of the client device, the video advertisement.

6. The computing system of claim 5, wherein the program instructions that, when executed by the one or more processors, further cause the one or more processors to at least:

determine an amount of the video advertisement presented on the client device; and charge a fee to a promoter of the video advertisement.

7. The computing system of claim 6, wherein the fee is based at least in part on the amount of the video advertisement presented.

8. The computing system of claim 6, wherein the program instructions that, when executed by the one or more processors, further cause the one or more processors to at least:

determine that the amount of the video advertisement presented on the display of the client device does not exceed a maximum threshold; and wherein the fee is less than a full amount charged when the video advertisement is completely presented on the client device.

9. The computing system of claim 6, wherein the program instructions that, when executed by the one or more processors, further cause the one or more processors to at least:

determine that the amount of the video advertisement presented on the display of the client device exceeds a maximum threshold; and wherein the fee is a full amount charged when the video advertisement is completely presented on the client device.

10. The computing system of claim 5, wherein a fee is not charged to a promoter of the video advertisement when the informed opt-in preview is presented on the client device.

11. The computing system of claim 5, wherein the scrolling is in a first direction and the progression of the presentation of the plurality of frames of the informed opt-in preview is in a direction consistent with the first direction.

12. The computing system of claim 5, wherein the program instructions that, when executed by the one or more processors, further cause the one or more processors to at least:

detect a second scrolling of the information in a direction opposite a direction of the scrolling; and regress a presentation of the plurality of frames of the informed opt-in preview according to the sequence and at a rate consistent with the second scrolling such that the presentation of a frame of the plurality of frames of the informed opt-in preview corresponds to the position of the informed opt-in preview on the display of the client device.

13. The computing system of claim 5, wherein the informed opt-in preview is a video that is progressed in a first direction in response to the scrolling.

14. The computing system of claim 5, wherein the information includes a content and wherein the program instructions that, when executed by the one or more processors, further cause the one or more processors to at least:

prior to presentation of the information on the display of the client device:
present initial content on the display of the client device, wherein the initial content includes at least a portion of the content and does not include a full view of the initial frame of the plurality of frames of the informed opt-in preview;

detect a second scrolling of the initial content;

move a position of the initial content such that the initial frame of the plurality of frames of the informed opt-in preview is fully displayed on the display of the client device; and subsequent to the initial frame of the plurality of frames of the informed opt-in preview being fully displayed on the display of the client device, progress the presentation of the plurality of frames of the informed opt-in preview according to the sequence and move the position of the opt-in preview on the display of the client device at the rate consistent with a continued scrolling.

15. The computing system of claim 5, wherein the information includes a content and wherein the program instructions that, when executed by the one or more processors, further cause the one or more processors to at least move, simultaneous with progression of the presentation of the plurality of frames of the informed opt-in preview and consistent with the scrolling, at least a portion of the content on the display of the client device such that a second at least a portion of the content is displayed on the display of the client device.

16. The computing system of claim 5, wherein presentation of each frame of the plurality of frames of the informed opt-in preview corresponds to a respective position on the display of the client device.

17. The computing system of claim 5, wherein the informed opt-in preview is selected from the plurality of informed opt-in previews based, at least in part, on a user preference of a user associated with the client device.

18. A computer-implemented method, comprising:
under control of one or more computing systems configured with executable instructions, receiving a video advertisement;

generating a plurality of informed opt-in previews from the video advertisement, wherein each of the plurality of informed opt-in previews is distinct from the video advertisement;

associating each of the plurality of informed opt-in previews with the video advertisement;

selecting a first informed opt-in preview from the plurality of informed opt-in previews;

receiving from the client device a request for content;

determining that the video advertisement is responsive to the request for content;

sending to the client device, in response to the request, the content and the first informed opt-in preview for presentation on the client device such that an initial frame of the first informed opt-in preview is presented at a first position on a display of the client device;

detecting a scrolling of the content;

simultaneously progressing a plurality of the frames of the first informed opt-in preview and moving a position of the first informed opt-in preview on the display of the client device consistent with the scrolling;

determining that a rate of scrolling exceeds a threshold and, based at least in part on the determination that the rate of scrolling exceeds the threshold, skipping at least one of the plurality of frames during the progressing of the plurality of frames of the first informed opt-in preview;

receiving from the client device a selection of the first informed opt-in preview; and sending to the client device, in response to receiving the selection, the video advertisement for presentation on the client device.

19. The computer-implemented method of claim 18, further comprising:
determining, based at least in part on the request, a display characteristic of the client device; and selecting, based at least in part on the display characteristic, the first informed opt-in preview from the plurality of informed opt-in previews.

20. The computer-implemented method of claim 18, wherein the first informed opt-in preview is generated such that a presentation of the first informed opt-in preview completes upon presentation of a final frame of the first informed opt-in preview at a second position of the display of the client device.

21. The computer-implemented method of claim 20, wherein:
the first position is proximate a first edge of the display of the client device; and the second position is proximate a second edge of the client device that is opposite the first edge of the client device.

22. The computer-implemented method of claim 18, wherein the presentation of the first informed opt-in preview is based at least in part on the position of the first informed opt-in preview on the display of the client device.

23. The computer-implemented method of claim 18, further comprising:
determining that an informed opt-in preview was not provided with the video advertisement; and generating the plurality of informed opt-in previews based at least in part on a determination that an informed opt-in preview was not provided with the video advertisement.

24. The computer-implemented method of claim 18, wherein:
the first informed opt-in preview is generated based at least in part on a first user preference;

a second informed opt-in preview of the plurality of informed opt-in previews is generated based at least in part on a second user preference; and the first informed opt-in preview and the second informed opt-in preview include at least one of a different content, length, or style.

25. The computer-implemented method of claim 24, wherein the first user preference is based at least in part on a first group of users and the second user preference is based at least in part on a second group of users.

* * * * *